US010944138B2

(12) United States Patent
Hong et al.

(10) Patent No.: US 10,944,138 B2
(45) Date of Patent: Mar. 9, 2021

(54) BATTERY PACK CASE HAVING EFFICIENT COOLING STRUCTURE

(71) Applicant: LG CHEM, LTD., Seoul (KR)

(72) Inventors: Soon Chang Hong, Daejeon (KR); Jinhong Park, Daejeon (KR); Hyoungsuk Lee, Daejeon (KR); Bohyon Kim, Daejeon (KR); Jin Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 194 days.

(21) Appl. No.: 15/507,069

(22) PCT Filed: Sep. 22, 2015

(86) PCT No.: PCT/KR2015/009942
§ 371 (c)(1),
(2) Date: Feb. 27, 2017

(87) PCT Pub. No.: WO2016/056774
PCT Pub. Date: Apr. 14, 2016

(65) Prior Publication Data
US 2017/0309980 A1    Oct. 26, 2017

(30) Foreign Application Priority Data
Oct. 6, 2014    (KR) .................. 10-2014-0134147

(51) Int. Cl.
*H01M 10/613*    (2014.01)
*H01M 10/6566*    (2014.01)
(Continued)

(52) U.S. Cl.
CPC ......... *H01M 10/6566* (2015.04); *H01M 2/10* (2013.01); *H01M 2/1072* (2013.01);
(Continued)

(58) Field of Classification Search
None
See application file for complete search history.

(56) References Cited

U.S. PATENT DOCUMENTS

| 5,589,290 A | 12/1996 | Klink et al. |
| 2006/0216581 A1 | 9/2006 | Hwang et al. |

(Continued)

FOREIGN PATENT DOCUMENTS

| CN | 1905269 A | 1/2007 |
| CN | 102334227 A | 1/2012 |

(Continued)

OTHER PUBLICATIONS

English Translation of CN103329341 (Year: 2013).*
(Continued)

*Primary Examiner* — Lucas J. O'Donnell
(74) *Attorney, Agent, or Firm* — Birch, Stewart, Kolasch & Birch, LLP

(57) ABSTRACT

Disclosed herein is a battery pack case configured to receive a battery module assembly including a plurality of battery modules, each having a plurality of battery cells or unit modules mounted therein, sequentially stacked, wherein a coolant inlet port and a coolant outlet port are located at the upper part and the lower part of the battery pack case, respectively, in a state in which the coolant inlet port and the coolant outlet port are opposite to each other such that a coolant for cooling the unit modules flows from one side of the battery modules to the opposite side of the battery modules in a direction perpendicular to a direction in which the unit modules are stacked, and an inclined plate for guiding the flow of the coolant is provided between the battery pack case and the battery modules.

19 Claims, 5 Drawing Sheets

(51) Int. Cl.
*H01M 10/655* (2014.01)
*H01M 2/10* (2006.01)
*H01M 10/625* (2014.01)
*H01M 10/647* (2014.01)
*H01M 2/20* (2006.01)
*H01M 10/0525* (2010.01)
*H01M 10/052* (2010.01)
*H01M 10/30* (2006.01)
*H01M 10/34* (2006.01)

(52) U.S. Cl.
CPC ......... *H01M 2/1077* (2013.01); *H01M 2/206* (2013.01); *H01M 10/0525* (2013.01); *H01M 10/613* (2015.04); *H01M 10/625* (2015.04); *H01M 10/647* (2015.04); *H01M 10/655* (2015.04); *H01M 10/052* (2013.01); *H01M 10/30* (2013.01); *H01M 10/345* (2013.01); *H01M 2220/20* (2013.01); *Y02T 10/70* (2013.01)

(56) References Cited

U.S. PATENT DOCUMENTS

| | | | |
|---|---|---|---|
| 2010/0273040 A1* | 10/2010 | Kubota | B60K 1/04 429/100 |
| 2011/0244295 A1 | 10/2011 | Han et al. | |
| 2013/0071719 A1 | 3/2013 | Chung et al. | |
| 2013/0216875 A1* | 8/2013 | Kim | B60L 50/64 429/83 |
| 2014/0057151 A1 | 2/2014 | Chung et al. | |

FOREIGN PATENT DOCUMENTS

| | | |
|---|---|---|
| CN | 102884671 A | 1/2013 |
| CN | 103329341 A | 9/2013 |
| CN | 205159382 U | 4/2016 |
| EP | 2631985 A2 | 8/2013 |
| JP | 7-272768 A | 10/1995 |
| JP | 2007-73205 A | 3/2007 |
| JP | 2013-525947 A | 6/2013 |
| JP | 2014-500575 A | 1/2014 |
| JP | 2014-500591 A | 1/2014 |
| JP | 2014-515550 A | 6/2014 |
| KR | 10-2005-0070727 A | 7/2005 |
| KR | 10-2006-0063173 A | 6/2006 |
| KR | 10-2007-0006952 A | 1/2007 |
| KR | 10-2011-0114454 A | 10/2011 |

OTHER PUBLICATIONS

International Search Report issued in PCT/KR2015/009942 (PCT/ISA/210), dated Dec. 14, 2015.
Extended European Search Report for European Application No. 15848774.4, dated Jun. 12, 2017.

* cited by examiner

[FIG. 1]
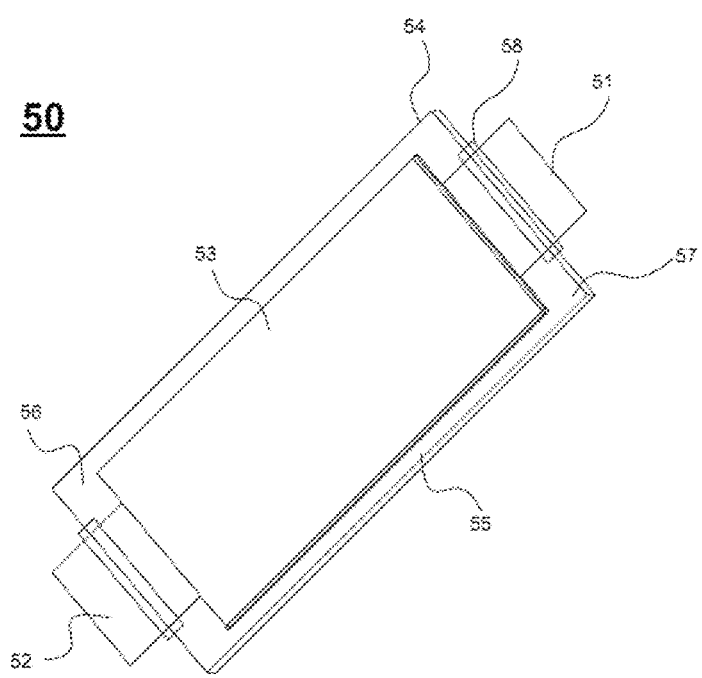

[FIG. 2]
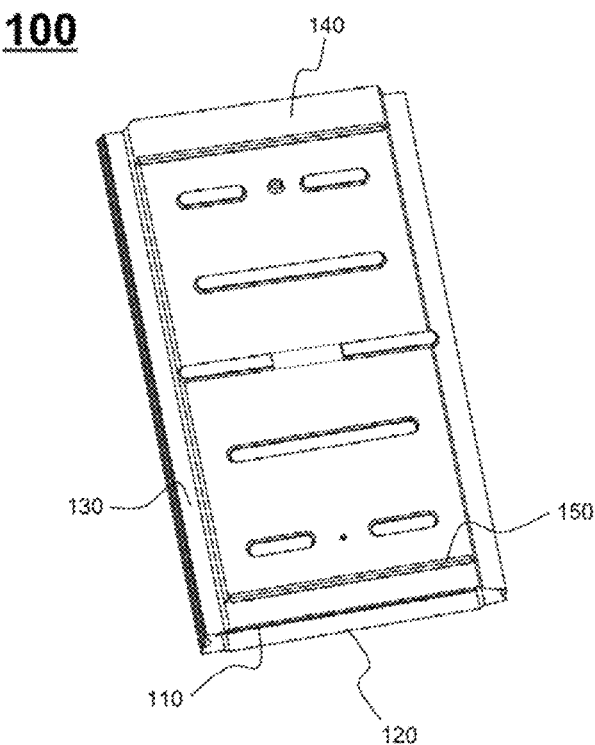
[FIG. 3]
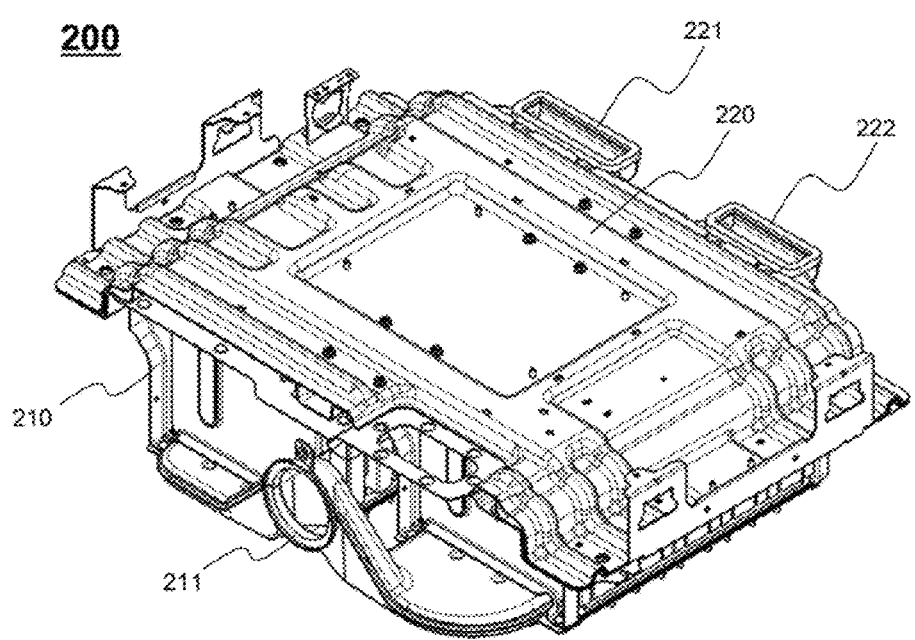

[FIG. 4]
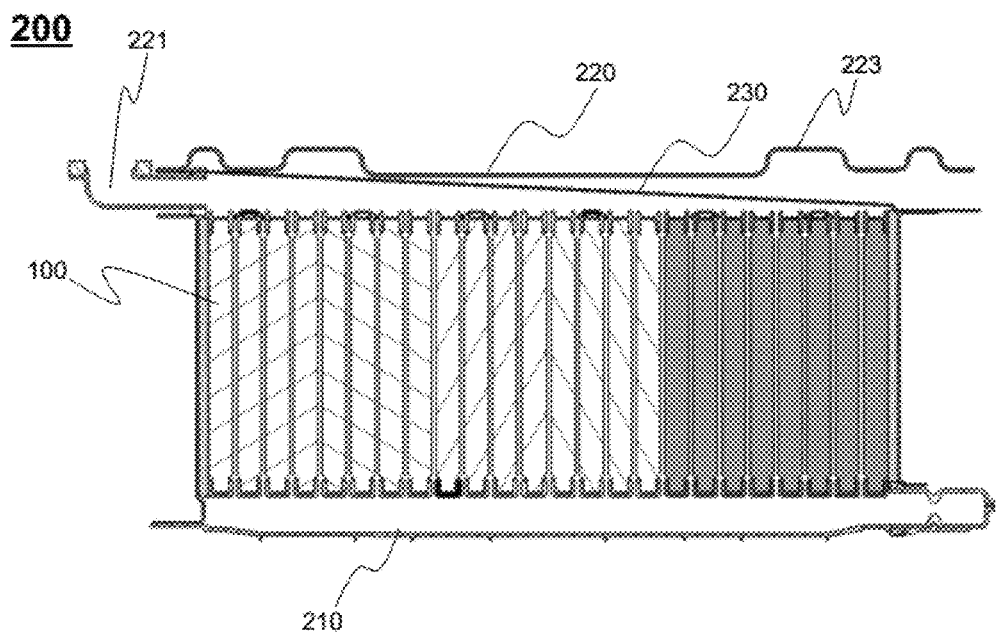
[FIG. 5]
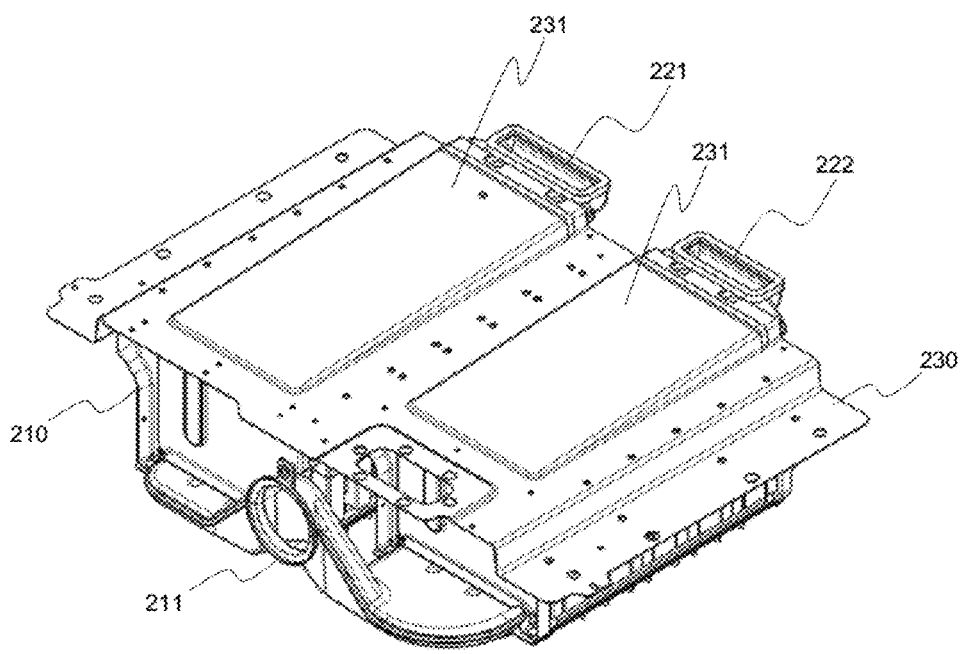

【FIG. 6】
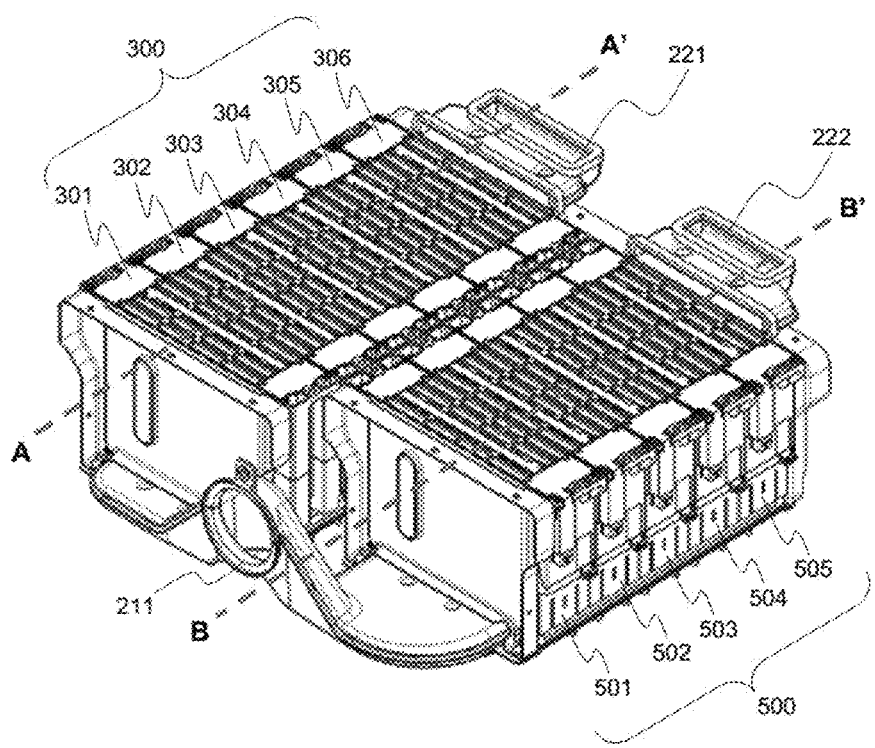
【FIG. 7】
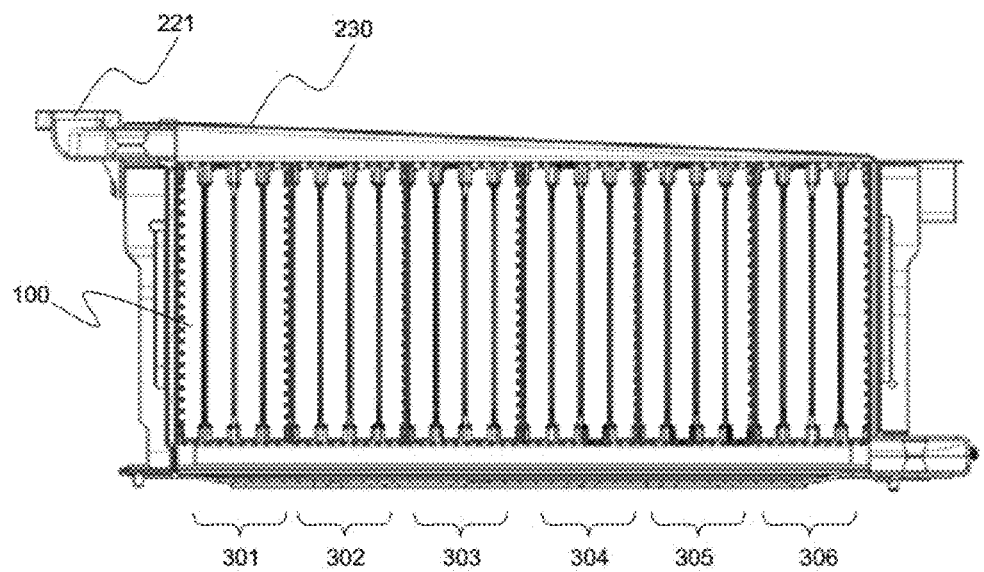

[FIG. 8]
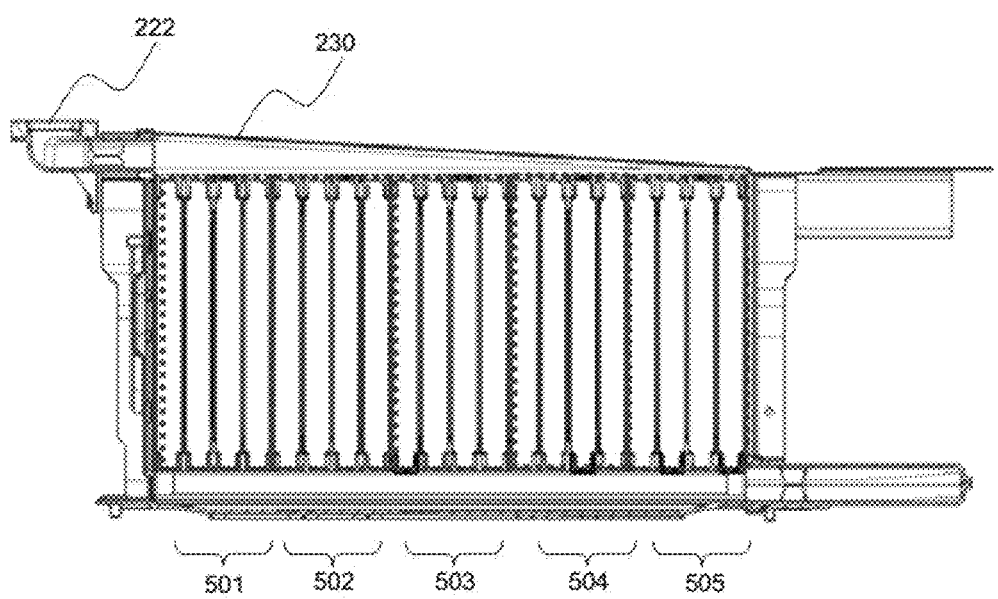

BATTERY PACK CASE HAVING EFFICIENT COOLING STRUCTURE

CROSS-REFERENCE TO RELATED APPLICATIONS

This application claims the benefit of Korean Patent Application No. 10-2014-0134147 filed on Oct. 6, 2014 with the Korean Intellectual Property Office, the disclosure of which is herein incorporated by reference in its entirety.

TECHNICAL FIELD

The present invention relates to a battery pack case having an efficient cooling structure.

BACKGROUND ART

In recent years, secondary batteries, which can be charged and discharged, have been widely used as an energy source for wireless mobile devices. In addition, the secondary batteries have attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module including a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery module to provide output and capacity required by a predetermined apparatus or device, it is necessary for the middle or large-sized battery module to be configured to have a structure in which a plurality of battery cells is electrically connected to each other in series or in parallel, and the battery cells are stable against external force.

In addition, battery cells constituting the middle or large-sized battery module are secondary batteries which can be charged and discharged. Consequently, a large amount of heat is generated from the high-output, large-capacity secondary batteries during the charge and discharge of the secondary batteries. If the heat, generated from unit cells of the middle or large-sized battery module during the charge and discharge of the unit cells, is not effectively removed from the unit cells, the heat accumulates in the unit cells with the result that deterioration of the unit cells is accelerated. According to circumstances, the unit cells may catch fire or explode. For this reason, a battery pack for vehicles, which is a high-output, large-capacity battery, needs a cooling system for cooling battery cells mounted in the battery pack.

However, a conventional cooling system is configured to have a structure in which a signal channel is formed throughout the battery pack. As a result, the battery cells may not be uniformly cooled. Furthermore, the battery pack is designed such that a mechanical structure and a cooling structure are separated from each other. In a case in which the inner space of the battery pack is small, therefore, it may be difficult to design and manufacture the battery pack.

Therefore, there is a high necessity for technology that is capable of fundamentally solving the above problems.

DISCLOSURE

Technical Problem

The present invention has been made to solve the above problems and other technical problems that have yet to be resolved.

It is an object of the present invention to provide a battery pack case configured such that the battery pack case is provided with a pair of coolant inlet ports defining separate coolant channels such that two battery module groups are independently cooled, and an inclined plate is provided in a space defined between the battery pack case and each battery module group, thereby preventing non-uniformity in cooling between unit modules or battery cells and, in addition, improving the strength of the battery pack case.

Technical Solution

In accordance with one aspect of the present invention, the above and other objects can be accomplished by the provision of a battery pack case configured to receive a battery module assembly including a plurality of battery modules, each having a plurality of battery cells or unit modules mounted therein, sequentially stacked, wherein a coolant inlet port and a coolant outlet port are located at the upper part and the lower part of the battery pack case, respectively, in a state in which the coolant inlet port and the coolant outlet port are opposite to each other such that a coolant for cooling the unit modules flows from one side of the battery modules to the opposite side of the battery modules in a direction perpendicular to a direction in which the unit modules are stacked, and an inclined plate for guiding the flow of the coolant is provided between the battery pack case and the battery modules.

Since the inclined plate is provided between the battery pack case according to the present invention and the battery modules, as described above, it is possible to effectively cool the battery cells or the unit modules and, in addition, to improve the strength of the battery pack case.

In a concrete example, the inclined plate may be integrally formed at the battery pack case.

The battery cells are not particularly restricted so long as the battery cells are secondary batteries that can be charged and discharged. Preferably, each of the battery cells may be a nickel-metal hydride secondary battery or a lithium secondary battery, which uses lithium ions as a medium. For example, each of the battery cells may be a plate-shaped battery cell, which provides a high stacking rate in a limited space. The plate-shaped battery cell is a battery cell having a small thickness and a relatively large width and length, which may minimize the overall size of a battery module when plate-shaped battery cells are stacked in order to constitute the battery module.

The nickel-metal hydride secondary battery is a secondary battery in which nickel is used as a positive electrode, a hydrogen storage alloy is used as a negative electrode, and an alkaline solution is used as an electrolyte. The nickel-metal hydride secondary battery has energy density per unit volume equivalent to about 2 times that of a nickel-cadmium battery. The nickel-metal hydride secondary battery may have a larger capacity than the nickel-cadmium battery. In addition, the nickel-metal hydride secondary battery may endure overdischarge and overcharge better than the nickel-cadmium battery, and may have a larger capacity per unit volume than the nickel-cadmium battery. Consequently, the nickel-metal hydride secondary battery may be preferably used as an energy source for electric vehicles or hybrid electric vehicles.

For the lithium secondary battery, for example, a metal oxide, such as $LiCoO_2$, is used as a positive electrode active material, and carbon is used as a negative electrode active material. The lithium secondary battery is manufactured by placing a porous polymer separator between a negative electrode and a positive electrode and injecting a non-aqueous electrolytic solution containing lithium salt, such as $LiPF_6$, thereinto. During charge, lithium ions are discharged from the positive electrode active material, and are inserted into a carbon layer of the negative electrode. During discharge, on the other hand, lithium ions are discharged from the carbon layer, and are inserted into the positive electrode active material. The non-aqueous electrolytic solution serves as a medium, through which lithium ions move between the negative electrode and the positive electrode. Since the lithium secondary battery exhibits high energy density and operating voltage and excellent retention and service-life characteristics, the lithium secondary battery may be preferably used as an energy source for various electronic products, electric vehicles, or hybrid electric vehicles.

In a concrete example, each of the battery cells may be configured to have a structure in which an electrode assembly is mounted in a battery case made of a laminate sheet including a metal layer and a resin layer, and then the outer edge of the battery case is sealed by thermal bonding. Specifically, each of the battery cells may be configured to have a structure in which an electrode assembly is mounted in a pouch-shaped battery case made of an aluminum laminate sheet. The battery cell with the above-stated construction may also be referred to as a pouch-shaped battery cell.

Two or more of the battery cells may be covered by a high-strength cell cover made of a synthetic resin or a metal material to constitute a unit module. The high-strength cell cover may protect the battery cells exhibiting low mechanical strength, and may restrain the repetitive expansion and contraction fluctuation during the charge and discharge of the battery cells, thereby preventing separation between sealed portions of the battery cells. Consequently, it is possible to manufacture a middle or large-sized battery module exhibiting higher safety In a concrete example, each of the unit modules may include two or more battery cells and a pair of high-strength cell covers coupled to each other for surrounding outer surfaces of the battery cells excluding electrode terminals of the battery cells.

Meanwhile, the coolant may be, for example, air. However, the present invention is not limited thereto.

In a concrete example, the battery pack case may include a pair of upper and lower cases. For example, the upper case may be provided with a pair of coolant inlet ports, through which coolants flow from one side of the battery modules to the opposite side of the battery modules along a space between the upper case and the inclined plate, and the lower case may be provided with a coolant outlet port, through which the coolants introduced through the coolant inlet ports are discharged, the coolant inlet ports being opposite to the coolant outlet port.

The coolant inlet ports may include a first coolant inlet port, through which a coolant is introduced into a first battery module group, and a second coolant inlet port, through which a coolant is introduced into a second battery module group, and the coolant outlet port may be formed along a virtual perpendicular center line between the first coolant inlet port and the second coolant inlet port.

The first coolant inlet port and the second coolant inlet port may be spaced apart from each other such that the first coolant inlet port and the second coolant inlet port define separate coolant channels.

In the above structure, the coolants may be individually introduced through the first coolant inlet port and the second coolant inlet port, and may then be discharged through the coolant outlet port in a mixed state.

In a concrete example, the first coolant inlet port and the second coolant inlet port may be formed at the upper part of the upper case, and the coolant outlet port may be disposed at an angle of 60 to 120 degrees to the coolant inlet ports when viewed in vertical section.

According to the present invention, the inclined plate may be provided between the battery pack case and the upper part and/or the lower part of the battery module assembly. For example, the inclined plate may be configured such that the height of the inclined plate linearly decreases from the coolant inlet port to the coolant outlet port when viewed in vertical section.

Specifically, the inclined plate may be provided at a region thereof corresponding to the top surface of each of the first and second battery module groups with an inclined surface, which protrude upward such that the coolant flow along the inclined surface.

According to circumstances, the inclined plate may be configured such that the height of the inclined plate linearly increases from the coolant inlet port to the coolant outlet port when viewed in vertical section.

According to the present invention, the battery pack case may be configured such that the length of the battery pack case in a direction in which the unit modules are stacked is greater than the length of the battery pack case in a width direction of the unit modules.

In a concrete example, the coolant outlet port may have a width equivalent to 10 to 70% the width of the battery pack case.

According to circumstances, a fan for driving the coolant to flow may be mounted in the coolant inlet port and/or the coolant outlet port.

In accordance with other aspects of the present invention, there are provided a battery pack configured to have a structure in which two or more battery modules are mounted in the battery pack case with the above-stated construction and a device using the battery modules or the battery pack as a power source.

The battery pack according to the present invention may be manufactured by combining battery modules based on desired output and capacity. The battery pack may be used as a power source of an electric vehicle, a hybrid electric vehicle, a plug-in hybrid electric vehicle, or a power storage apparatus, which has a limited installation space and is exposed to frequent vibration and strong impact, in consideration of installation efficiency and structural stability as described above; however, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a pouch-shaped battery cell according to an embodiment of the present invention;

FIG. 2 is a perspective view showing a cell cover, in which two battery cells, one of which is shown in FIG. 1, will be mounted;

FIG. 3 is a perspective view showing a battery pack according to an embodiment of the present invention;

FIG. 4 is a sectional view showing the battery pack of FIG. 3;

FIG. 5 is a perspective view showing a battery pack, to which an inclined plate according to an embodiment of the present invention is mounted;

FIG. 6 is a perspective view showing a battery pack, in which a battery module according to an embodiment of the present invention is mounted;

FIG. 7 is a sectional view taken along line A-A' of FIG. 6; and

FIG. 8 is a sectional view taken along line B-B' of FIG. 6.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view typically showing a pouch-shaped battery cell, and FIG. 2 is a perspective view showing a cell cover, in which two battery cells, one of which is shown in FIG. 1, will be mounted in order to constitute a unit module.

Referring to these figures, a pouch-shaped battery cell 50 is configured to have a structure in which two electrode leads 51 and 52 protrude respectively from the upper end and the lower end of a battery cell body 53 such that the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure including a resin layer, a metal foil layer, and a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to melt the resin layers thereof. According to circumstances, the opposite sides 55, the upper ends 56, and the lower ends 57 of the upper and lower sheathing parts of the sheathing member 54 may be bonded to each other using an adhesive. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by melting. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally bonded to each other, in a state in which film type sealing members 58 are interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

A cell cover 100 has two pouch-shaped battery cells (not shown), one of which is shown in FIG. 1, mounted therein. The cell cover 100 serves not only to increase mechanical strength of the battery cells but also to enable the battery cells to be easily mounted to a module case (not shown). The battery cells are mounted in the cell cover 100 in a state in which an electrode terminal located at one side of one of the battery cells is connected in series to an electrode terminal located at one side of the other battery cell, and the connection part of the electrode terminals of the battery cells is bent such that the battery cells are disposed in tight contact.

The cell cover 100 includes a pair of members 110 and 120 which are configured to be coupled to each other. The cell cover 100 is made of a high-strength metal sheet. Steps 130 for enabling the module to be easily fixed are formed at left and right side edges of the cell cover 100, and steps 140 having the same function are also formed at the upper end and the lower end of the cell cover 100. In addition, fixing parts 150 are formed at the upper end and the lower end of the cell cover 100 such that the fixing parts 150 extend in a width direction of the cell cover 100. Consequently, the cell cover 100 is easily mounted to the module case (not shown).

FIG. 3 is a perspective view typically showing a battery pack according to an embodiment of the present invention, and FIG. 4 is a sectional view typically showing the battery pack of FIG. 3.

Referring to these figures, a battery pack 100 is configured to have a structure including a plurality of battery modules (not shown), each of which includes a plurality of unit modules (not shown), each including a plurality of battery cells 100, which is stacked in a longitudinal direction of the battery pack 100, a battery pack case (not shown) including an upper case 220 and a lower case 210, and an inclined plate 230 mounted between the battery modules and the upper case 220.

The upper case 220 is provided with a pair of coolant inlet ports 221 and 222, and the lower case 210 is provided with a coolant outlet port 211, which is opposite to the coolant inlet ports 221 and 222. In addition, the upper case 220 is provided at the top surface thereof with a plurality of beads 223 for increasing the strength of the battery pack 200.

The inclined plate 230 is configured such that the height of the inclined plate 230 gradually decreases from the coolant inlet ports 221 and 222 to the coolant outlet port 211.

FIG. 5 is a perspective view typically showing a battery pack, to which an inclined plate according to an embodiment of the present invention is mounted, FIG. 6 is a perspective view typically showing a battery pack, in which a battery module according to an embodiment of the present invention is mounted, FIG. 7 is a sectional view taken along line A-A' of FIG. 6, and FIG. 8 is a sectional view taken along line B-B' of FIG. 6.

Referring to these figures together with FIGS. 1 to 4, the battery pack 200 includes a pair of battery module groups 300 and 500, which are arranged in two rows. The battery module group 300 includes six unit modules 301, 302, 303, 304, 305, and 306, each of which includes four battery cells 100. Similarly, the battery module group 500 includes five unit modules 501, 502, 503, 504, and 505, each of which includes four battery cells 100.

Inclined plates 230 are mounted over the battery module groups 300 and 500. The inclined plates 230 are provided at regions thereof corresponding to the top surfaces of the battery module groups 300 and 500 with inclined surfaces 231. Each of the inclined surfaces 231 is configured such that the height of each of the inclined surfaces 231 gradually decreases from the coolant inlet ports 221 and 222 to the coolant outlet port 211.

As a result, the battery module groups 300 and 500 are spatially separated from each other by the inclined surfaces 231, which are formed at the respective inclined plates 230. Consequently, a coolant introduced through the coolant inlet port 221 cools the battery module group 300, and a coolant introduced through the coolant inlet port 222 cools the battery module group 500. After cooling, the coolants are discharged through the coolant outlet port 211 in a mixed state.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure in which an inclined plate for guiding the flow of a coolant is provided between a battery pack case and a battery module. Consequently, it is possible to increase the strength of the battery pack case and, in addition, to effectively reduce the temperature of battery cells or unit cells.

In addition, a battery pack according to the present invention is configured to have a structure in which coolant inlet ports are separately provided at regions of a battery pack case opposite to a coolant outlet port such that the coolant inlet ports correspond respectively to battery modules. As a result, the flow length and speed of a coolant are reduced by half. Consequently, it is possible to reduce the temperature deviation and the pressure difference caused in the battery modules in a direction in which the coolant flows.

The invention claimed is:

1. A battery pack case configured to receive a battery module assembly comprising a plurality of battery modules, each having a plurality of sequentially stacked battery cells or sequentially stacked unit modules mounted therein, wherein a coolant inlet port and a coolant outlet port are located at an upper part and a lower part of the battery pack case, respectively, in a state in which the coolant inlet port and the coolant outlet port are opposite to each other such that a coolant for cooling the battery cells or unit modules flows from one side of the battery modules to the opposite side of the battery modules in a direction perpendicular to a direction in which the battery cells or unit modules are stacked, an inclined plate for guiding a flow of the coolant is provided downstream from the coolant inlet port and between the battery pack case and the battery modules such that the inclined plate is spaced from an inner surface of the upper part of the battery pack case, the battery pack case comprises an upper case and a lower case, the inclined plate is placed between an upper part of the upper case and the battery modules such that the upper part of the upper case entirely covers the inclined plate, the inclined plate is configured such that a height of the inclined plate linearly decreases from the coolant inlet port to the coolant outlet port when viewed in vertical section, a spacing between the inner surface of the upper part of the battery pack case and an upper surface of the inclined plate increases from the coolant inlet port to the coolant outlet port, the inclined plate comprises a first part parallel to top surfaces of the battery modules and second parts protruding convexly from the first part and having inclined surfaces formed thereon, the inclined plate is provided at regions thereof with the inclined surfaces of the second parts corresponding to the top surfaces of the battery modules, each inclined surface is configured such that a height thereof gradually decreases from the coolant inlet port to the coolant outlet port, and the inclined plate is received inside the battery pack case together with the battery module assembly.

2. The battery pack case according to claim 1, wherein each of the battery cells is a nickel-metal hydride secondary battery or a lithium secondary battery.

3. The battery pack case according to claim 1, wherein each of the battery cells is a pouch-shaped battery cell having an electrode assembly mounted in a battery case made of a laminate sheet comprising a metal layer and a resin layer.

4. The battery pack case according to claim 1, wherein each of the unit modules comprises two or more battery cells, electrode terminals of which are connected in series to each other, a connection part of the electrode terminals being bent such that the battery cells are arranged in a stacked state, and a pair of high-strength cell covers coupled to each other for surrounding outer surfaces of the battery cells excluding the electrode terminals of the battery cells.

5. The battery pack case according to claim 1, wherein the coolant is air.

6. The battery pack case according to claim 1, wherein the coolant inlet port is provided in plurality at the upper case to provide a pair of coolant inlet ports, through which coolants flow from one side of the battery modules to the opposite side of the battery modules along a space between the upper case and the inclined plate, and the lower case is provided with the coolant outlet port, through which the coolants introduced through the coolant inlet ports are discharged, the coolant inlet ports being opposite to the coolant outlet port.

7. The battery pack case according to claim 6, wherein the coolant inlet ports comprise a first coolant inlet port, through which a coolant is introduced into a first battery module group, and a second coolant inlet port, through which a coolant is introduced into a second battery module group, and the coolant outlet port is formed along a virtual perpendicular center line between the first coolant inlet port and the second coolant inlet port.

8. The battery pack case according to claim 7, wherein the first coolant inlet port and the second coolant inlet port are spaced apart from each other such that the first coolant inlet port and the second coolant inlet port define separate coolant channels.

9. The battery pack case according to claim 7, wherein the coolants are individually introduced through the first coolant inlet port and the second coolant inlet port, and are then discharged through the coolant outlet port in a mixed state.

10. The battery pack case according to claim 7, wherein the first coolant inlet port and the second coolant inlet port are formed at an upper part of the upper case, and the coolant outlet port is disposed at an angle of 60 to 120 degrees to the coolant inlet ports when viewed in vertical section.

11. The battery pack case according to claim 1, wherein the battery pack case is configured such that a length of the battery pack case in a direction in which the unit modules are stacked is greater than a length of the battery pack case in a width direction of the unit modules.

12. The battery pack case according to claim 1, wherein the coolant outlet port has a width equivalent to 10 to 70% a width of the battery pack case.

13. The battery pack case according to claim 1, wherein a fan for driving the coolant to flow is mounted in the coolant inlet port and/or the coolant outlet port.

14. A battery pack configured to have a structure in which a battery module assembly is mounted in a battery pack case according to claim 1.

15. A device using a battery pack according to claim 14 as a power source.

16. The device according to claim 15, wherein the device is an electric vehicle, a hybrid electric vehicle, a plug-in hybrid electric vehicle, or a power storage apparatus.

17. The battery pack case according to claim 1, wherein the upper part of the upper pack case includes one or more beads.

18. The battery pack case according to claim 1, wherein the lower pack case defines the coolant port outlet.

19. The battery pack case according to claim 1, wherein the upper part of the upper case entirely covers the inclined plate such that the inclined plate is not exposed to the outside.

* * * * *